United States Patent
Matsuura

(10) Patent No.: US 6,235,088 B1
(45) Date of Patent: May 22, 2001

(54) ALCOHOL SEPARATOR FOR AN ALCOHOL SOLUTION

(76) Inventor: Kazuo Matsuura, 19, Aza Yanaginomoto Ikenotani, Oasa-cho, Naruto-shi, Tokushima (JP), 779-0303

(*) Notice: Subject to any disclaimer, the term of this patent is extended or adjusted under 35 U.S.C. 154(b) by 0 days.

(21) Appl. No.: 09/311,269

(22) Filed: May 14, 1999

(51) Int. Cl.[7] .................................................. B03C 3/014
(52) U.S. Cl. .................... 96/53; 95/67; 95/73; 96/57; 96/87; 261/81; 261/DIG. 48
(58) Field of Search .................... 96/52, 53, 27, 96/57, 74, 87, 96; 95/71, 72, 67, 73; 261/81, DIG. 48

(56) References Cited

U.S. PATENT DOCUMENTS

| | | | |
|---|---|---|---|
| 2,454,757 | * 11/1948 | Smith | 96/27 X |
| 2,874,802 | * 2/1959 | Gustafsson et al. | 96/53 X |
| 2,935,375 | * 5/1960 | Boucher | 96/52 X |
| 3,137,446 | * 6/1964 | Masuda | 96/53 X |
| 3,387,607 | * 6/1968 | Gauthier et al. | 261/DIG. 48 |
| 3,643,623 | * 2/1972 | Eng et al. | 96/27 X |
| 4,070,424 | * 1/1978 | Olson et al. | 261/DIG. 48 |
| 4,793,714 | * 12/1988 | Gruber | 261/81 X |
| 5,084,072 | * 1/1992 | Reynolds | 96/52 X |
| 5,176,856 | * 1/1993 | Takahashi et al. | 261/81 X |
| 5,217,165 | * 6/1993 | Takahashi et al. | 261/81 X |
| 5,792,241 | * 8/1998 | Browitt | 261/81 X |
| 5,893,943 | * 4/1999 | Durham et al. | 96/53 X |

FOREIGN PATENT DOCUMENTS

| | | | |
|---|---|---|---|
| 18084 | * 10/1980 | (EP) | 95/71 |
| 2303584 | * 10/1976 | (FR) | 96/53 |
| 58-21629 | 2/1983 | (JP) . | |
| 59-48427 | 3/1984 | (JP) . | |
| 07185203 | 7/1995 | (JP) . | |

OTHER PUBLICATIONS

Uragami, T., For Possibility of Alcohol Fuel Separation Techniques, 1996, Bio Industry vol. 13, No. 9.

* cited by examiner

Primary Examiner—Richard L. Chiesa
(74) Attorney, Agent, or Firm—Wenderoth, Lind & Ponack, L.L.P.

(57) ABSTRACT

An alcohol separator is provided with an atomizer which supplies a mist of atomized alcohol solution to one region of a flow path, and an electrostatic collection device which uses an electrostatic field corona discharge to capture, liquefy, and recover alcohol solution mist generated by the atomizer.

17 Claims, 3 Drawing Sheets

ALCOHOL SEPARATOR FOR AN ALCOHOL SOLUTION

BACKGROUND OF THE INVENTION

This invention concerns an alcohol separator which separates an even higher concentration of alcohol from an alcohol solution of sake (Japanese rice wine) or other alcoholic solution, and specifically relates to an alcohol separator which can operate with little pressure loss and low energy cost.

From early times the distillation process has been used to separate alcohol in a highly concentrated state from an alcohol solution, and in particular from an alcohol-water solution. Even today, most processes to separate alcohol are dominated by distillation. However, distillation requires large amounts of energy to separate alcohol. Further, as an azeotropic mixture, an alcohol-water solution is known to require many stages to separate the water from a solution of high alcohol concentration.

For these reasons distillation is a high energy consumption process. In particular, for separation of highly concentrated alcohol from a fermented alcohol solution starting with bio-mass, a change from this maximum energy consumption process to a new alcohol separation method which does not use heat has been in demand.

As alcohol separation methods which use non-thermal processes, the Purvaparation method which uses an organic copolymer porous membrane (Japanese Patent Applications SHO-58-21629, 1983, and SHO-59-48427, 1984) and the ultra-sonic mist producing method (Japanese Patent Applications HEI-7-185203, 1995) are known. In the Purvaparation method, development of an alcohol selective permeable membrane to replace distillation has been lagging. For this reason, an experimental bench scale plant for evaluation does not exist (Bioindustry, Vol. 13, No. 9, 1996).

As in the later method above, experiments have tried to obtain highly concentrated alcohol solutions by cooling a mist produced by applying ultrasound to an alcohol solution. However, it is impossible to collect all the alcohol mist and vapor by cooling alone. The majority of the mist passes completely through the cooler, and recovery rates have been extremely inefficient.

Consequently, in prior art alcohol separators mentioned above, the following improvements have been left without realization.

(1) First, the major drawback of energy consumption by processes such as distillation and vaporization, which depend on heat, must be overcome. Therefore, equipment which can operate at room temperature and pressure is preferable.

(2) Second, the ability to efficiently collect extremely fine mist containing highly concentrated alcohol is required. For example, alcohol can certainly be collected by activated carbon absorption. However, once the alcohol is absorbed, heat must be applied to extract it from the activated carbon, ad ultimately this is not a low energy process.

(3) Third, throughout the entire process, pressure loss must be low. In a process with large pressure loss, a high degree of sealed enclosure is required to limit loss of alcohol outside the system. This generates large cost because high output reverse pressure fans and blowers are necessary.

It is thus an object of the present invention to respond to the current situation cited above, and in particular, recover a highly concentrated alcohol solution with low energy and by increasing alcohol separation efficiency by generating a corona discharge with an electrostatic field to collect mist from an alcohol solution.

The above and further objects and features of the invention will more fully be apparent from the following detailed description with accompanying drawings.

SUMMARY OF THE INVENTION

The alcohol separator for an alcohol solution of the present invention is provided with a flow path for moving gas in a given direction via a blower device, an atomizer in one part of the flow path for supplying a mist by atomizing an alcohol solution, and an electrostatic collection device downstream of the atomizer for liquefying and collecting the mist by corona discharge due to an electrostatic field.

Since the alcohol separator described above forms a mist from the alcohol solution and recovers this mist with an electrostatic collection device, the mist recovery rate can be improved remarkably. Further, a highly concentrated alcohol solution can be recovered, and odor can be removed by ozone from electrostatic collection.

BRIEF DESCRIPTION OF THE DRAWINGS

FIG. 2 (B) is a front view in cross section of the same atomizer in FIG. 2 (A).

FIG. 3 (B) is a front view in cross section of the same atomizer in FIG. 3 (A).

DETAILED DESCRIPTION OF THE INVENTION

Figure 1:
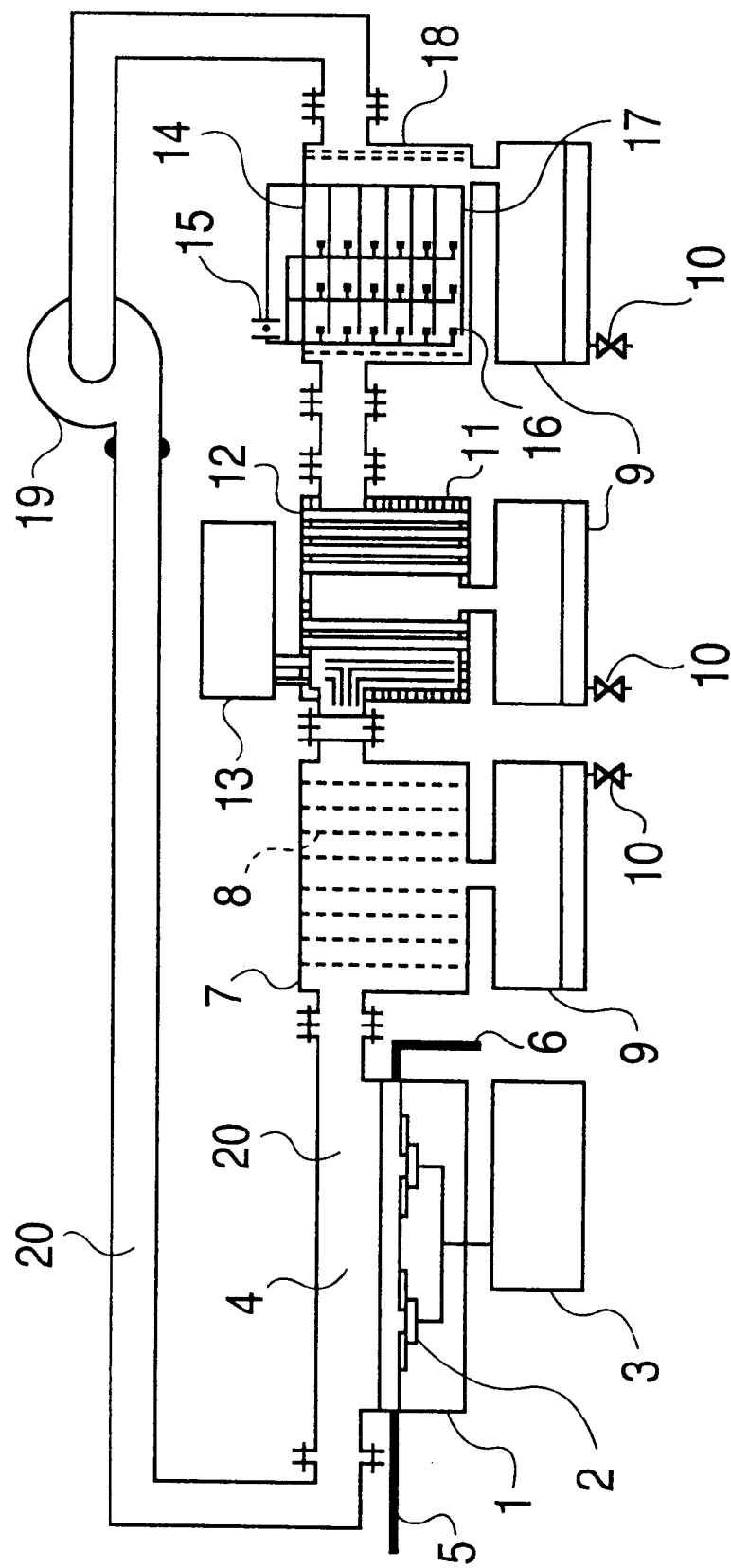
FIG. 1 is a cross section view showing an embodied form of the alcohol separator of the present invention.
Figure 2A:
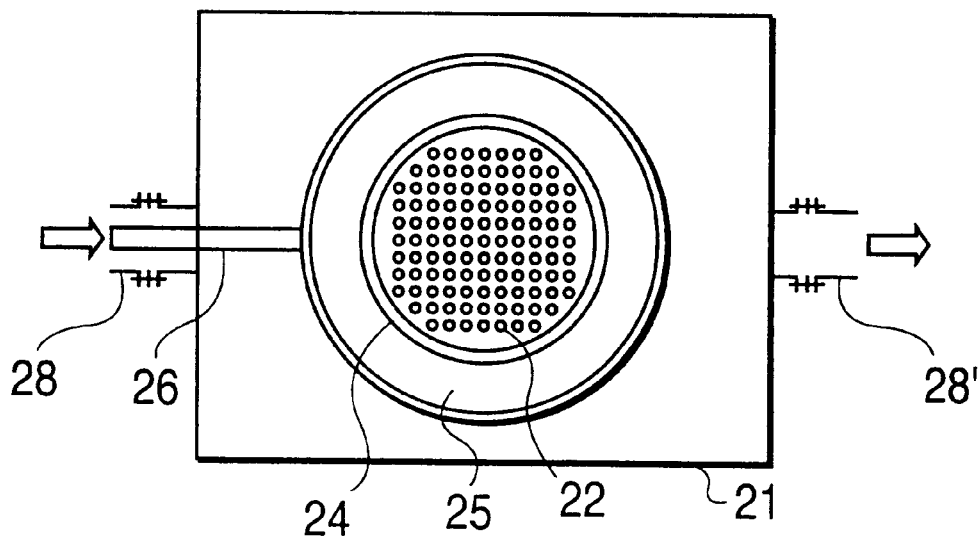
FIG. 2 (A) is a plan view in cross section showing an example of an atomizer for the same embodied form.
Figure 2B:
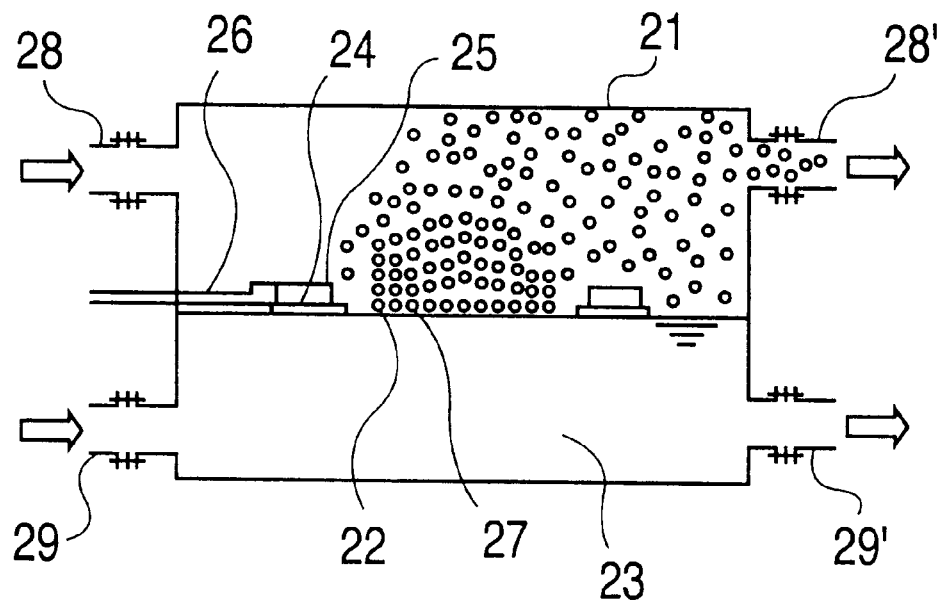
Figure 3A:
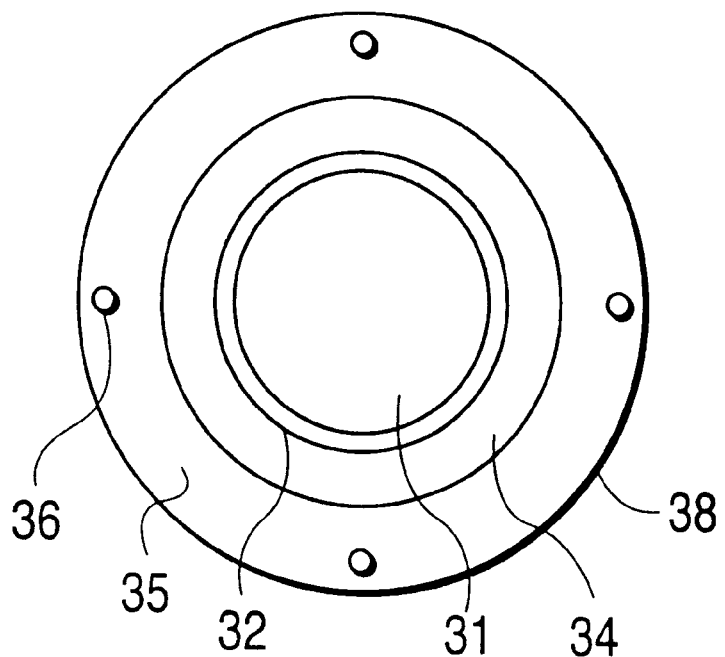
FIG. 3 (A) is a plan view in cross section showing still another example of an atomizer.
Figure 3B:
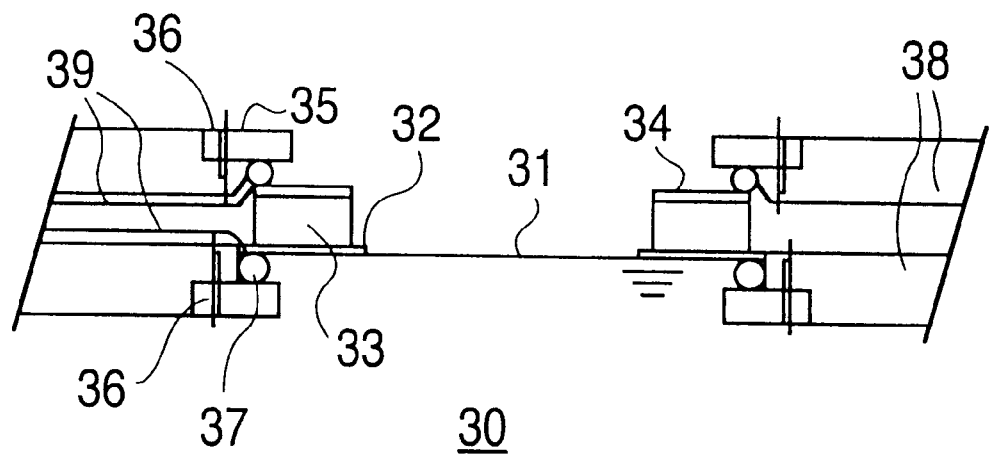

The alcohol separator for an alcohol solution of the present invention supplies alcohol solution to one part of the flow path which moves gas in a prescribed direction, and, after atomizing supplied alcohol solution, the atomized mist is liquefied and collected by an electrostatic field. Further, in the alcohol separator of the present invention it is preferable to liquefy and collect the atomized mist with an electrostatic field after cooling the mist.

An alcohol solution can be converted to mist by methods such as ultrasound or spraying, etc. The smaller the mist, the tendency to contain more concentrated alcohol. In addition, the generated mist has a distribution centered about a mean radius. Consequently, comparatively large diameter mist can be removed by physical impact. Specifically, large diameter mist can be removed by prior art pre-processing apparatus such as a cyclone or a punched plate.

Comparatively small diameter mist can be partially recovered by a cooler. The cooler further converts alcohol in the vapor state to mist. Alcohol converted to minute mist and initially minute mist are delivered to the electrostatic collection device after passing through the cooler. Mist in the electrostatic collection device attains a coulomb charge due to corona discharge in the electrostatic field, is attracted to one electrode plate of the electrostatic collection device, and is liquefied and recovered. Of all the mist produced, only 10% to 20% can be recovered by trying devices such as a cyclone, a punched plate, or a cooler, etc. By using an electrostatic collection device, as in the present invention, efficient alcohol separation becomes possible for the first time.

Furthermore, the alcohol separator of the present invention utilizes ozone generated by the electrostatic field to reduce odor. Ozone interacts with mist at the gas-liquid interface which is enlarged by atomization. The alcohol separator allows efficient alcohol recovery while remarkably reducing distasteful alcohol solution odor due to the effects of ozone.

In addition, the alcohol separator of the present invention can be made with a closed loop flow path where gas passing through the electrostatic collection device can be re-circulated to the atomizer. In this system, a non-flammable inert gas is suitable for circulation in the flow path. An atomizer which converts alcohol solution to mist by applying ultrasound to an alcohol solution from an ultrasonic vibrator is also suitable.

In this alcohol separator, an alcohol solution tub is formed in one part of the flow path, and membrane material with many minute holes of 0.1 $\mu$m to 20 $\mu$m in diameter is provided between the flow path and the tub. The membrane material isolates alcohol solution in the tub from vapor in the flow path, and atomized alcohol solution mist passes through the minute holes of the membrane material releasing into the flow path in an ideal fashion. It is also possible to form membrane material from organic polymer porous membrane. Further, a pre-cooler to cool gas in the flow path upstream of the atomizer can be fashioned to suppress vaporization of the mist.

For a closed flow path system, in case of some type of malfunction where all the alcohol mist cannot be recovered at the electrostatic field, gas and vapors are re-circulated to the mist generating section to limit alcohol loss.

For a system with non-flammable inert gas flowing in the flow path, oxidation of solutions being processed is limited by maintaining oxygen within the system to a low level. In an oxygen rich environment, ignition of an alcohol solution is possible from a spark discharge in the electrostatic field.

Fine mist can be generated by applying ultrasound to the alcohol solution. Ultrasound, preferably applied from the vapor phase side of the membrane material, can generate a finer mist through the minute holes of the membrane material. Organic polymer porous membrane can be used as the membrane material.

In the alcohol separator system, provision of a pre-cooler upstream of the atomizer to pre-cool gas in the flow path can also prevent vaporization of alcohol from the surface of mist particles. In the capture of mist particles in the electrostatic field, mist particles which enter the electrostatic field are subject to coulomb force, but vapor within the electrostatic field is in no way subject to coulomb force. Therefore, it is desirable to suppress vaporization from the start, and pre-cooling of the mist-carrying air or gas and the alcohol solution itself is preferable.

The alcohol separator of the present invention can process alcoholic beverages; namely refined sake, wine, beer, whiskey, brandy, liqueur, shochu, and miscellaneous beverages, etc. In the present invention, water, sugars, proteins, fats, and minerals easily remain with the original alcohol solution, while aromatic components such as alcohol, and esters, etc. are easily transported to the mist recovery side. In the alcohol separator described above, mist and vapor are produced by ultrasound atomization at room temperature and pressure with an extremely small amount of power, and with slight refrigeration output, the entire alcohol component is converted to mist. Due to electrostatic field operation, alcohol mist recovery at low cost and with little pressure loss becomes possible.

The following further explains an embodied form of the present invention referring to the attached figures.

Turning to FIG. 1, a cross section view shows an embodied form of the alcohol separator of the present invention. This alcohol separator is provided with a flow path 20 having a tightly sealed closed loop configuration wherein gas is circulated in a counter-clockwise flow by a blower 19, an alcohol solution flow path 5 to supply alcohol solution to a tub 1 formed in one part of the flow path 20, ultrasonic vibrators 2 to atomize alcohol solution supplied to the tub 1 and produce mist in the vapor phase section 4 of the flow path 20, a punched plate recover section 7 which is downstream from the vapor phase section 4 to collect large mist particles with punched pates, a cooling recover section 11 which is downstream from the punched plate recover section 7 and which is one embodiment of a cooler to cool, liquefy, and collect mist passing through the punched plate recover section 7 as well as to convert alcohol solution vapor to mist, and an electrostatic recovery section 14 which is downstream from the cooling recovery section 11 and which is one embodiment of an electrostatic collection device to capture mist converted from alcohol solution vapor as well as fine mist not liquefied by the cooling recovery section 11 using corona discharge in an electrostatic field with parallel plate electrodes 17 to capture, liquefy, and recover the mist.

When ultrasound is generated in the alcohol solution by ultrasonic vibrators 2 in the alcohol solution tub 1, mist is generated in the vapor phase section 4 of the flow path 20. A DC power supply 3 to supply power to the ultrasonic vibrators 2 is provided external to the tub 1, but it may be a single unit with the ultrasonic vibrators 2. The original solution for processing is discharged from the tub 1 via solution flow path 6.

Generated mist and vapor is carried by gas flow created by the blower 19 to the punched plate recovery section 7. Amongst the mist, large diameter particles are first of all liquefied at the punched plate recovery section 7 by impacting punched plates 8 positioned perpendicular to the flow of mist.

The punched plates 8 are made of material with good corrosion resistance such as stainless steel, and are provided with many small holes several millimeters in diameter. Here, recovered liquid is stored in an accumulation tub 9, and is taken out of the system through a valve 10.

Mist and vapor slipping through the punched plate recovery section 7 reach the cooling recovery section 11 where mist is further liquefied and recovered and vapor is converted to mist. Distribution pipes are filled with refrigerant, and continuous cooling is achieved due to a refrigeration unit 13. Liquid recovered at the cooling recovery section 11 also is stored in an accumulation tub 9, and is taken out of the system through a valve 10.

The smallest diameter mist particles as well as mist particles converted from vapor, which were not liquefied in the cooling recovery section 11, reach the electrostatic recovery section 14 where almost all are liquefied and recovered. The electrostatic field in this electrostatic recovery section 14 is generated by applying several KV to 20 KV of DC voltage produced by a power supply 15. As shown in FIG. 1, the positive electrode of the power supply 15 is connected to discharge wires 16 established perpendicular to the flow of mist and the negative electrode is connected to parallel electrode plates 17 established parallel to the flow of mist. The polarity of the electrodes may be reversed, or AC voltage may be applied. Further, the parallel electrode plates 17 may be disposed perpendicular to the flow of mist. When voltage exceeds a critical value, a corona discharge is generated from the discharge wires 16, and mist particles in the electrostatic field develop a coulomb charge. Mist particles even of sub-micron size are attracted by their coulomb charge to the parallel electrode plates 17 where they are cooled and liquefied on electrode plate surfaces. Again recovered liquid is stored in an accumulation tub 9. Finally, a stainless steel plate 18 with many small holes is provided at the exit of the electrostatic recovery section 14 to prevent recovered liquid from flowing out of the system.

Dry air which passes through the electrostatic recovery section 14 once again enters the blower 19 directly and is circulated to the mist generating vapor phase section 4 via the flow path 20. There are three objectives for making the system closed in this fashion. One objective is to prevent mist loss outside the system in case there is mist which is not recovered in the electrostatic recovery section 14. A second objective is to prevent vaporization from the surface of mist particles by introducing air flow cooled by the cooling recovery section 11 directly into the mist generating vapor phase section 4 (vapor cannot be recovered with the electrostatic field), and to reduce the load on the cooler. A third objective is to keep ozone generated at the electrostatic field from being discharged from the system, and to efficiently eliminate odors. It is also possible to provide a separate gas pre-cooler upstream of the mist generating vapor phase section 4.

With the embodied form of the alcohol separator of the present invention configured as described above, alcohol separation for alcoholic beverages can be carried out extremely efficiently at low temperatures. Further, the concentration of the recovered alcohol solution is higher, the farther downstream in the flow path 20 the accumulation tub 9 is located.

Next, another configuration for the alcohol solution atomizer is explained. FIGS. 2 (A) and (B) are cross section views showing a region corresponding to the solution tub 1 and vapor phase section 4 of the flow path 20 of FIG. 1. In the atomizer of this figure, the solution tub 23 and vapor phase section 21 of the flow path are separated by membrane material 22 having many small holes 0.1 $\mu$m to 20 $\mu$m in diameter. Below the membrane material 22, alcohol solution fills the tub 23 to contact the membrane material 22. Above the membrane material 22, an electrode plate 24 is disposed with piezoelectric ceramic material 25 pressure joined to the electrode plate 24. An electrode is attached to the upper surface of the piezoelectric ceramic material 25, and when voltage is applied via conducting lines 26, many mist particles 27 are generated from the small holes provided in the membrane material 22 as a result of ultrasonic waves.

The mist 27 produced is exhausted from the vapor phase section 21 through a duct 28' due to air introduced through a duct 28, and is recovered by a system as previously described by the embodied form above. Also as shown, the alcohol solution is introduced to the solution tube 23 through the flow path 29 and exhausted through a flow path 29'. In this manner, the ultrasonic oscillating material may not directly touch the alcohol solution, and may even be configured to project ultrasound towards the alcohol solution. Further, the atomizer may also be a sprayer or two-phase flow nozzle, etc.

The atomizer shown in FIGS. 3 (A) and (B) uses an organic polymer porous membrane 31 in place of the membrane material 22 shown in FIG. 2. The porous membrane 31 of organic polymer covers the upper surface of the alcohol solution tub 30. When voltage is applied via conducting lines 39 to both sides of an electrode 32, ceramic material 33 pressure joined to that electrode 32, and an electrode plate 34 attached on top, fine mist is generated (not illustrated). The porous membrane and vibrating material 32 to 34 are installed through support pieces 38 via o-rings 37 to fitting plates 35 with screws 36. In this case as well, the tub 30 is filled with alcohol solution up to the porous membrane 31.

When a polymer porous membrane is used in this fashion, a wide choice is available of hole diameters and treatments suitable to the solution such as hydrophobic and hydrophilic membranes. This selection is extremely fortunate for efficiently obtaining a large number of fine mist particles.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or equivalents of such metes and bounds thereof are therefore intended to be embraced by the claims.

What is claimed is:

1. An alcohol separator for an alcohol solution, comprising:

(1) a flow path closed to the outside which moves gas in a given direction with a blower;

(2) an atomizer which supplies a mist of atomized alcohol solution in one section of the flow path; and (3) an electrostatic collection device downstream in the flow path from the atomizer, which captures, liquefies, and recovers alcohol solution mist with an electrostatic field via corona discharge.

2. An alcohol separator for an alcohol solution, as recited in claim 1, wherein a cooler is disposed between the atomizer and the electrostatic collection device to cool alcohol solution mist generated by the atomizer.

3. An alcohol separator for an alcohol solution, as recited in claim 2, wherein the cooler cools, liquefies, and recovers mist particles.

4. An alcohol separator for an alcohol solution, as recited in claim 2, wherein the cooler cools mist particles and supplies vapor included in the mist, as mist particles to the electrostatic collection device.

5. An alcohol separator for an alcohol solution, as recited in claim 1, wherein the flow path is configured as a closed loop, and gas passing through the electrostatic collection device is re-circulated to the atomizer.

6. An alcohol separator for an alcohol solution, as recited in claim 1, wherein gas flowing in the flow path is non-flammable inert gas.

7. An alcohol separator for an alcohol solution, as recited in claim 1, wherein the atomizer is provided with an ultrasonic vibrator, and the ultrasonic vibrator induces ultrasonic oscillations in the alcohol solution to generate mist from the alcohol solution.

8. An alcohol separator for an alcohol solution, as recited in claim 7, wherein the ultrasonic vibrator is piezoelectric ceramic material.

9. An alcohol separator for an alcohol solution, as recited in claim 8, wherein the piezoelectric ceramic material is annular in shape.

10. An alcohol separator for an alcohol solution, as recited in claim 7, wherein an alcohol solution tub is provided in one part of the flow path, membrane material having many minute holes is provided between the tub and the flow path, the membrane material isolates the alcohol solution in the tub from the vapor phase of the flow path, and alcohol solution mist atomized by ultrasound passes through the minute holes of the membrane material and sprays into the flow path.

11. An alcohol separator for an alcohol solution, as recited in claim 10, wherein the minute holes of the membrane material have a diameter from 0.1 $\mu$m to 20 $\mu$m.

12. An alcohol separator for an alcohol solution, as recited in claim 10, wherein the membrane material is a porous membrane made of organic polymer.

13. An alcohol separator for an alcohol solution, as recited in claim 10, wherein the membrane material is disposed inside an annular shaped piezoelectric ceramic material.

14. An alcohol separator for an alcohol solution, as recited in claim 2, wherein a punched plate recovery section is provided between the atomizer and the cooler, and a portion of the mist generated by the atomizer is liquefied and recovered at this punched plate recovery section.

15. An alcohol separator for an alcohol solution, as recited in claim 1, wherein the electrostatic collection device is provided with electric discharge wires and a plurality of parallel electrode plates disposed in a mutually parallel arrangement.

16. An alcohol separator for an alcohol solution, as recited in claim 15, wherein a corona discharge is caused between electric discharge wires and electrode plates giving a coulomb charge to mist particles, which are attracted to, and collected at the electrode plates.

17. An alcohol separator for an alcohol solution, as recited in claim 15, wherein the electrode plates are oriented parallel to the mist flow direction.

* * * * *